Figure 1:
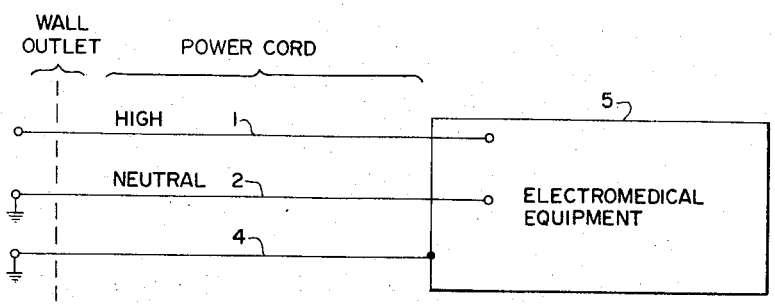

United States Patent [19]

Kusters et al.

[11] 3,866,093

[45] Feb. 11, 1975

[54] LOW LEAKAGE ELECTRICAL POWER INPUT CIRCUIT FOR ELECTROMEDICAL AND OTHER SIMILAR APPARATUS

[76] Inventors: Norbert L. Kusters, 817 Eastbourne Ave.; Malcolm P. MacMartin, 45 Oriole Dr., both of Ottawa, Ontario, Canada

[22] Filed: Sept. 17, 1973

[21] Appl. No.: 398,207

[30] Foreign Application Priority Data
Sept. 18, 1972 Canada................................ 151921

[52] U.S. Cl. ................................ 317/18 R, 317/45
[51] Int. Cl. ............................................. H02h 3/16
[58] Field of Search.......... 317/10, 9 A, 18 R, 18 A, 317/18 B, 18 C, 18 D, 45; 317/14 R

[56] References Cited
UNITED STATES PATENTS

| | | | |
|---|---|---|---|
| 1,337,866 | 4/1920 | Whitaker.............................. | 317/45 |
| 3,581,153 | 5/1971 | Joyce................................... | 317/18 D |
| 3,611,053 | 10/1971 | Rowell................................. | 317/18 B |
| 3,708,721 | 1/1973 | Marcade et al. ................... | 317/18 B |
| 3,769,549 | 10/1930 | Bangert.............................. | 317/18 A |

Primary Examiner—James D. Trammell
Attorney, Agent, or Firm—J. R. Hughes

[57] ABSTRACT

A low leakage power input circuit for electromedical or other electrical equipment having an electrical power element, normally the primary winding of a transformer, and where the leakage current from the supply circuit to a grounding circuit should be very small made up of a power cord made up of a high line, a neutral line, and a grounding conductor, said high and neutral lines adapted for connection at one end to an electrical power source and said neutral and grounding conductor adapted for connection at the same end of the power cord to electrical ground, high and neutral lines connected at the power end of the power cord to the electrical power element of the electrical equipment, a first guard means enclosing the electrical power element of the electrical equipment and connected to the neutral line or to ground via a separate ground line, and a second guard in the form of a conducting metal enclosure, enclosing the first guard and insulated therefrom, and connected to the grounding conductor.

18 Claims, 8 Drawing Figures

3,866,093

LOW LEAKAGE ELECTRICAL POWER INPUT CIRCUIT FOR ELECTROMEDICAL AND OTHER SIMILAR APPARATUS

This invention relates to a power input circuit for electromedical and other equipment where the leakage current from the supply circuit to the grounding circuit should be very small and more particularly to a low leakage isolating transformer for such equipment.

Modern technology has produced a multiplicity of instrumentation for the diagnosis and treatment of patients. As a result hospitals are being supplied with more and more electromedical and electrosurgical equipment which is being used both in the operating theatres and in other treatment areas. Therefore the danger of patients being electrocuted particularly those who are connected to implanted electrodes, such as on cardiac catheters and electronic pacemakers, and especially if they are connected to other electrical devices at the same time, is a cause of considerable concern. Electrical safety in hospitals has been a continuously growing problem in recent years.

The electrical equipment should not introduce a danger to patients or staff under normal or non-fault conditions, but even more important, it should be safe even under fault conditions, such as when stressed insulation fails or a grounding circuit becomes open.

It is therefore an object of this invention to provide a power input circuit for electromedical apparatus that will greatly reduce the leakage paths and thus the risk of unacceptably large currents passing through the body of a patient.

These and other objects of the invention are achieved by a power input circuit for electromedical equipment having a reference ground point comprising a primary winding for connection to a supply, a first guard means enclosing the primary and connected to the low or neutral conductor of the power cord and a second guard means in the form of a metallic case enclosing the primary winding and first guard and connected to ground by the grounding conductor of the power cord. The power transfer from the primary winding to the equipment may be by electromagnetic coupling to a secondary winding which is enclosed in a case which is connected to the first case or it may be by an insulated shaft to equipment external to the first case if the primary winding is the winding of a motor.

In drawings which illustrate embodiments of the invention,

FIG. 1 is a circuit diagram of a conventional prior art power supply connection to electromedical apparatus, in which the neutral of the power supply line is connected to ground at the supply end and where the metal case surrounding the electromedical equipment is connected to ground by the ground lead.

Figure 2:
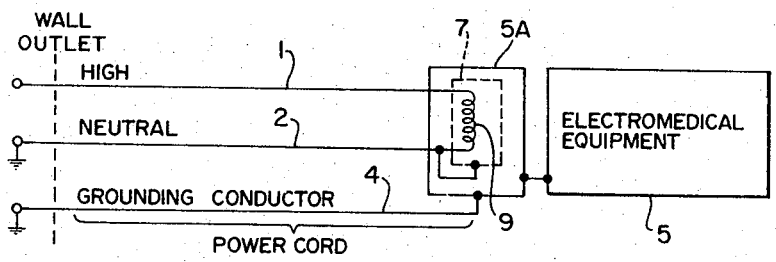
Figure 3:
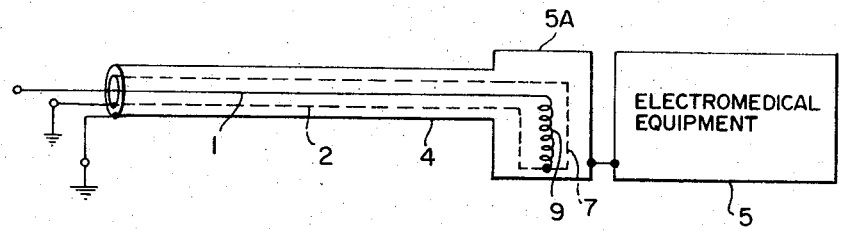
Figure 4:
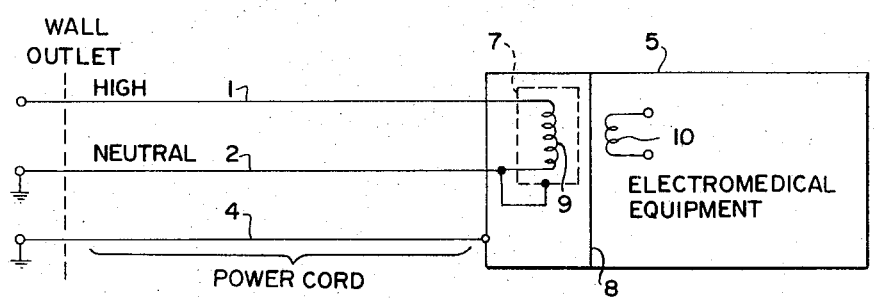
Figure 5:
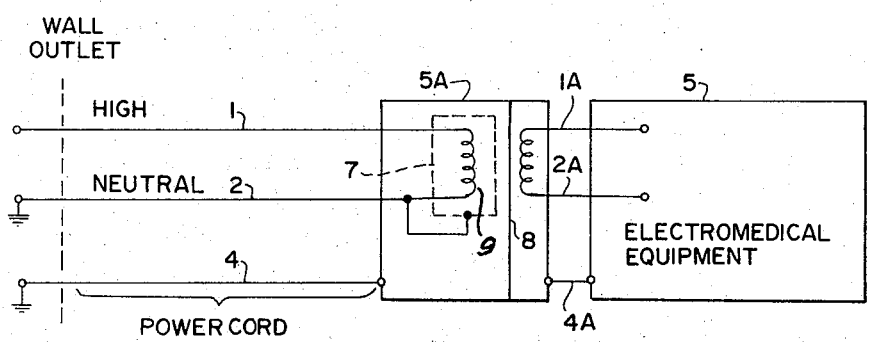
Figure 6:
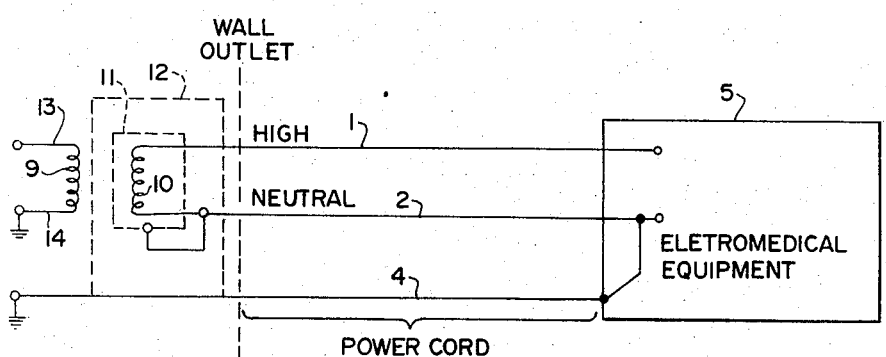
Figure 7:
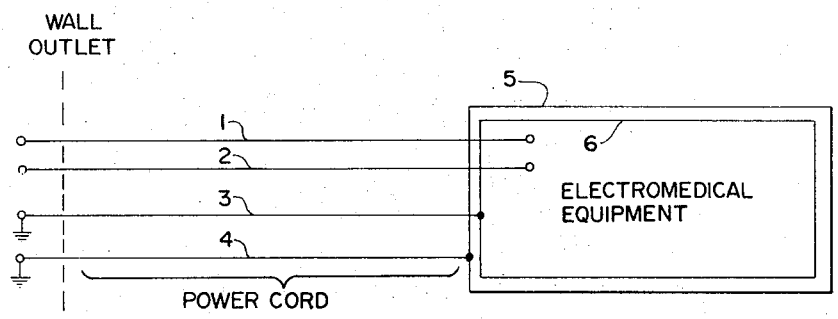
Figure 8:
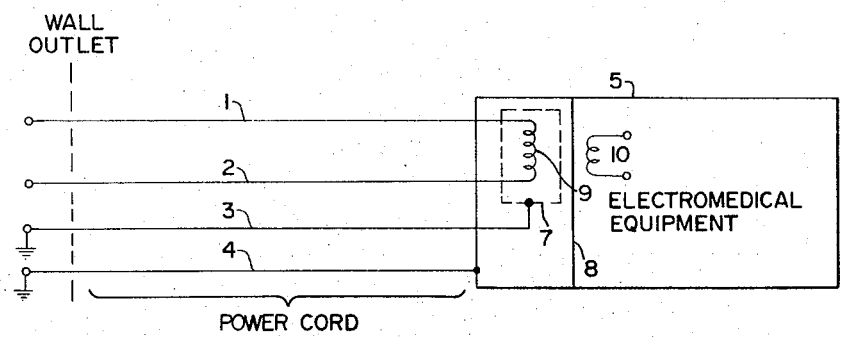

FIG. 2 is a diagram of a preferred embodiment of the invention where the method of transfer of power from the primary winding to the equipment is not specifically designated, e.g., it may be either by mechanical or electrical coupling, FIG. 3 is a diagram of a circuit similar to that of FIG. 2 but wherein the guard and an extension of the conductive case is applied to and extends over the power cord as well as the equipment input (primary winding), FIG. 4 is a circuit diagram of an arrangement for guarding electromedical equipment employing a transformer and a three-wire grounded neutral supply, FIG. 5 is a circuit diagram of an arrangement for guarding electromedical equipment employing an auxiliary guarded transformer, FIG. 6 is a circuit of an arrangement for auxiliary guarded transformer positioned at the supply end of the line cord, FIG. 7 is a system which shows guarded electromedical equipment which is totally enclosed in a conductive guard which is connected to ground through a guard lead. A conductive case, connected to ground through a ground lead, totally encloses the guard. The guard and case are insulated electrically from each other, and FIG. 8 is a circuit diagram of an arrangement for guarding electromedical equipment with an ungrounded supply and two grounding lines.

Referring to FIG. 1, a conventional system involves a grounded supply and a three-wire power cord to the electromedical equipment. Two wires supply the power from the source through the "high" conductor 1 and a "neutral" conductor 2. The electromedical equipment is enclosed in a conductive case 5 which is connected to ground through a grounding conductor 4. A patient may be connected to ground, and may also be touching or connected to the grounded case of the electromedical equipment. Under normal (non-fault) conditions the leakage current from such a grounded power circuit through the grounding conductor 4 must be kept down to a few milliamperes. If the insulation between the power circuit and the case 5 fails, the fault current in the grounding conductor 4 may become much higher. If a break occurs in the grounding conductor 4 or in the grounding connection at the wall outlet, the leakage current from the case to ground will flow through the patient connected as above. If the patient is connected to the circuit by an electrode near the heart, the maximum allowable current is a few (e.g., 5) microamperes. It has been practically impossible to keep the leakage current down to this level. If both faults occur at the same time (insulation failure and a break in the grounding circuit) the current through the patient may be fatal even without an implanted electrode.

FIG. 2 illustrates an arrangement according to the invention that will greatly reduce leakage currents. The electromedical or other equipment is enclosed in a case 5. The power cord consists of a high line 1, a neutral line 2, and a grounding conductor 4. The high and neutral are connected to a primary winding 9 enclosed in a guard or shield 7 with both being enclosed in a metallic case 5A connected or bonded to case 5. Guard 7 is connected to the neutral line and grounding conductor 4 is connected to case 5A. The method of transfer of power from the primary winding to the electromedical equipment is not specified. It could be either by mechanical coupling via an insulated shaft if the primary is a motor winding or by transformer action if a secondary winding is involved. If there is a breakdown of the stressed insulation between primary winding 9 and guard 7, the increased current will flow in the neutral conductor but there will be a very small (a few microamperes) increase in current in grounding conductor 4.

The power cord must also be safe. The leakage from all other conductors to the grounding conductor 4 under both normal and fault conditions, must not generate in the grounding conductor a voltage or current which would be hazardous to a patient connected between the electromedical equipment and ground. This can be accomplished by a concentric shield type of power cord as shown in FIG. 3. In this version the guarding extends over the power cord as well. The power cord is similar to a doubly shielded coaxial cable with the centre conductor being the high line 1, the first coaxial line being the low or neutral line 2, and the outer or second coaxial line becoming grounding conductor 4. In this case the two concentric conductors serve two purposes; as power conductors and as part of the guarding of the power input circuit. The possibility of an insulation failure from lead 1 to 4 is negligible, as is the possibility of a patient coming in contact with any conductor except the grounding conductor. A flat lead version (not shown) may be used but is less preferable. It should have the neutral conductor between the high lead and the grounding lead, so that the neutral lead intercepts any leakage current from the high lead.

If the power comes from the source to the equipment through a transformer either the primary or the secondary of the transformer may be a source of leakage currents. To intercept leakage currents from either source, and prevent them from flowing through the grounding conductor 4, two guards are placed between the primary and secondary windings of the tranformer as shown in FIG. 4. Guard 7 encloses the primary winding 9 and is connected to ground through neutral line 2. Guard 8 (with case 5) encloses the secondary winding 10 and is connected to ground through the grounding conductor 4. Note that only the primary winding is enclosed in two concentric guards.

Existing electromedical equipment may be guarded by the addition of a guarded input transformer, placed external to but close to the electromedical equipment as shown in FIG. 5. If the conductive cases 5 and 5A around the equipment and the transformer are electrically connected, and the interconnecting power leads are protected and intact, the performance is the same as in FIG. 4.

The neutral line is grounded at the power source so it can be used as the grounding conductor for the guard 7 as shown in FIGS. 2, 3, 4, and 5. Under normal (non-fault) conditions the leakage current from the primary winding 9 to guard 7 flows back to ground at the power source through the neutral conductor 2. Since the voltage between guards 7 and 8 is much smaller than the applied voltage, being the voltage drop in the neutral conductor due to the line current (load current plus leakage current), the leakage current in the grounding conductor 4, can easily be kept to a very few microamperes so that the system is safe even if the grounding conductor breaks. If the stressed insulation between 9 and 7 fails, a large fault current will flow in the neutral conductor. The current in the grounding conductor 4 may rise to several microamperes, still safe for a patient with an implanted electrode. If the neutral line breaks so that the supply voltage is imposed between guard 7 and 9, the current in the grounding conductor increases, but the power to the electromedical equipment goes off, so that the presence of this fault is immediately obvious to the operator.

If large currents flow in the neutral conductor 2, or if the resistance of the neutral conductor is high because of excessive length, the voltage at the equipment between the neutral and grounding conductors in FIGS. 2, 3, 4 or 5 may become relatively large. In this case objectionably large leakage currents may flow from guard 7 to 8 and through the grounding conductor 4. Connecting the guarded isolating transformer at the supply end of the line cord, as shown in FIG. 6, avoids this problem. The neutral conductor 2 is connected to the grounding conductor at the electromedical equipment as shown. Leakage current from the primary winding 9 to the guard 12 or fault current due to a failure of the stressed insulation is a load on the supply but has no effect outside the wall outlet as it induces no current in the grounding conductor 4. Leakage between the secondary winding 10 and guard 11 produces a circulating current, but no current through the neutral or ground lead. Leakage, or fault current, from the "high" lead 1 to the case of the equipment 5 is a load on the supply but does not introduce current in the grounding conductor 4. Thus in all these cases, a break in the grounding conductor does not cause an unacceptable current to flow through a patient who is connected to the circuit in such a manner that he carries the current to ground.

The low leakage guarding system has been described with a grounded supply (i.e., the neutral conductor 2 connected to ground). It can also be used with an ungrounded supply, where the impedance from line 1 and 2 to ground is high. Referring to FIG. 7 a guarded system in conjunction with an ungrounded supply has the equipment enclosed in a guard 6 and a case 5 which are insulated from each other. The guard and case are connected to ground by grounding conductors 3 and 4. Leakage current from the power circuit may flow to the guard 6 and then back to ground through the guard grounding conductor 3. The voltage, and the leakage current, between the guard and the case around the equipment, is very small and hence current in the grounding conductor is very small. Thus the system is safe even if the grounding conductor breaks since the current through the grounding conductor which might then flow through the patient is below the danger level even for a patient with an implanted electrode. The inner guard 6 intercepts leakage current from the primary power circuit and prevents it from reaching the case 5 or from flowing through the grounding conductor 4.

In FIG. 8, the leakage from the secondary winding 10 may flow inside the case 5 but guard 9 prevents it from flowing through leads 3 or 4, even if the insulation between winding 10 and guard 8 fails. Of course, if a component connected to the secondary circuit, such as a probe, is external to the case, adequate precautions must be taken to ensure that leakage currents through this connection are negligibly small, for example, by keeping the probe impedance very high. Under normal (non-fault) conditions the leakage current from the primary winding 9 flows through the stressed insulation to the guard 7, and back to ground through the lead 3. The small voltage generated in lead 3 by this current also is between guards 7 and 9 but the resultant current is lead 4 is negligible. If the stressed insulation between the primary winding 9 and the guard 7 fails, the increased current will flow in lead 3 and develop a voltage between guards 7 and 9 which is larger than before but still is too small to generate an objectionable current in lead 4.

If the four conductor power cord shown in FIGS. 7 and 8 is used, the performance is the same as before, with the leakage currents from the power circuit even lower than before because of the extra impedance to ground provided by the ungrounded connection. If a fault occurs which connects one of the supply lines to ground, the circuit then reverts to the grounded condition which has already been shown to be safe.

The performance of the circuit of FIG. 6 is not affected by whether line 4 is connected to ground or not. If the line is not grounded, the impedance to leakage currents flowing from the primary power circuit to guard 12 and to ground is higher than if the line 14 is grounded. However these leakage currents cannot flow in grounding conductor 4.

In the above discussion, the invention has been described chiefly in relation to the primary of a transformer or a winding of an electrical motor. If will be realized that other forms of electrical power elements may exist in electromedical and similar equipment that require protection and thus be subject to this invention. In addition, in the description, two guards enclosing the electrical power element (winding) are specified. These will normally also include insulation material between them as well as insulation between the power element and the first guard. The terminology "completely enclosing in a continuous and non-perforated manner." It will be realized that in some applications, the guards will be in the form of a grid or screen and of course openings are required in the guards for passage of conductors, shafts, or other electrical or mechanical interconnecting components.

We claim:

1. A low leakage power input circuit for electromedical or other electrical equipment having an electrical power element and where the leakage current from the supply circuit to a grounding circuit should be very small comprising:
   a. a power cord made up of a high line, a neutral line, and a grounding conductor, said high and neutral lines adapted for connection at one end to an electrical power source and said neutral and grounding conductor adapted for connection at the same end of the power cord to electrical ground,
   b. said high and neutral lines connected at the power end of the power cord to the electrical power element of the electrical equipment,
   c. a first guard means ecnlosing the electrical power element of the electrical equipment and connected to the neutral line, and
   d. a second guard in the form of a conducting metal enclosure, enclosing the first guard and insulated therefrom, and connected to the said grounding conductor.

2. A low leakage power input circuit as in claim 1 wherein the electrical power element is the primary of a transformer and the guards are interposed between the primary and secondary of said transformer.

3. A low leakage power input circuit as in claim 1 wherein the electrical power element is a winding of an electrical motor.

4. A low leakage power input circuit as in claim 1 wherein the power cord is a double shielded coaxial cable having a center conductor and inner and outer coaxial conductors with the center conductor connected as the high line, the inner coaxial conductor as the neutral line, and the outer coaxial conductor as the grounding conductor.

5. A low leakage power input circuit as in claim 4 wherein the electrical power element is the primary of a transformer and the guards are interposed between the primary and secondary of said transformer.

6. A low leakage power input circuit as in claim 4 wherein the electrical power element is a winding of an electrical motor.

7. A power input circuit for electromedical equipment, said equipment having a reference ground point, comprising:
   a. an isolating transformer having a primary for connection to a supply and a secondary for connection to the electromedical equipment,
   b. a first guard means positioned between primary and secondary enclosing the primary winding and connected to ground,
   c. a second guard in the form of a metallic case surrounding the first guard and connected to ground via a grounding conductor.

8. A power input circuit as in claim 7 wherein the isolating transformer is positioned adjacent the electromedical equipment casing.

9. A power input circuit for electromedical or other electrical equipment where the leakage current from the supply circuit to a grounding circuit should be very small comprising:
   a. a power cord made up of a high line and a neutral line connected to the electromedical equipment and a grounding line connected to the equipment casing and ground, said neutral being connected to the grounding conductor adjacent the electrical equipment,
   b. an isolating transformer incorporated in the wall outlet position having a primary connected to the supply and a secondary connected to the said high and neutral lines,
   c. a first guard means positioned between primary and secondary and enclosing the secondary winding and connected to the neutral line,
   d. a second guard enclosing the first guard and connected to ground.

10. A power input circuit for electromedical equipment, said equipment having a casing, comprising:
   a. an isolating transformer having a primary and a secondary winding, said secondary adapted for connection to the electromedical equipment,
   b. high voltage and neutral conductors connected to said primary,
   c. a first guard means positioned between primary and secondary, and enclosing said primary winding,
   d. a first grounding conductor connected to said first guard,
   e. a second guard between the first guard and secondary which with the case encloses the first guard,
   f. a second grounding conductor connected to said second guard and said casing,
   g. said high voltage, neutral, and first and second grounding conductors forming the power cord for said equipment.

11. A power input circuit for electromedical equipment, said equipment having a casing, comprising:
   a. an isolating transformer having a primary and a secondary winding, said secondary adapted for connection to the electromedical equipment,
   b. high voltage and neutral conductors connected to said primary,
   c. a first guard means positioned between primary and secondary and enclosing said primary, said guard means connected directly to said neutral conductor, d. a second guard means positioned between first guard and secondary, and with the case enclosing the first guard,
e. a grounding conductor connected to said second guard means and said casing,
f. said high voltage, neutral, and grounding conductors forming the power cord for said equipment.

12. A power input circuit for electromedical equipment, said equipment having a casing, comprising:
a. an isolating transformer positioned at or adjacent to the power supply point of the system and having a primary connected to high voltage and neutral supplies and a secondary,
b. high voltage and neutral conductors connected between secondary and the electromedical equipment,
c. a first guard means positioned between primary and secondary and connected directly to ground,
d. a second guard means positioned between the first guard and secondary and connected directly to said neutral conductor, and enclosing the secondary, and
e. a grounding conductor connected between ground at the supply point and the electromedical equipment casing, said neutral being connected to casing of the electromedical equipment,
f. said high, neutral, and grounding conductor forming the power cord for said equipment.

13. A low leakage power input circuit for electromedical or other electrical equipment having an electrical power element and where the leakage current from the supply circuit to a grounding circuit should be very small comprising:
a. a power cord made up of a high line, a neutral line, and a ground conductor, said high and neutral lines adapted for connection at one end to an electrical power source and said neutral and grounding conductor adapted for connection at the same end of the power cord to electrical ground,
b. said high and neutral lines connected at the power end of the power cord to the electrical power element of the electrical equipment,
c. a first guard means enclosing the electrical power element of the electrical equipment and connected to ground via a separate grounding line, and
d. a second guard in the form of a conducting metal enclosure, enclosing the first guard and insulated therefrom, and connected to the said grounding conductor.

14. A low leakage power input circuit as in claim 13 wherein the electrical power element is the primary of a transformer and the guards are interposed between the primary and secondary of said transformer.

15. A low leakage power input circuit as in claim 13 wherein the electrical power element is a winding of an electrical motor.

16. A low leakage power input circuit as in claim 13 wherein the power cord is a double shielded coaxial cable having a center conductor and inner and outer coaxial conductors with the center conductor connected as the high line, the inner coaxial conductor as the neutral line, and the outer coaxial conductor as the grounding conductor.

17. A power input circuit for electromedical equipment, said equipment having a reference ground point, comprising:
a. an isolating transformer having a primary for connection to a supply via a high line and a neutral line and a secondary for connection to the electromedical equipment,
b. a first guard means positioned between primary and secondary enclosing the primary winding and connected to the said neutral connection of said primary,
c. a second guard in the form of a metallic case surrounding the first guard and connected to ground via a grounding conductor.

18. A power input circuit as in claim 17 wherein the isolating transformer is positioned adjacent the electromedical equipment casing.

* * * * *